United States Patent [19]

Yeh

[11] Patent Number: 5,358,572
[45] Date of Patent: Oct. 25, 1994

[54] METHOD FOR CLEANING AN ALDEHYDE FROM SILANE COATED CONTAINER WITH AN ACID SOLUTION

[75] Inventor: Ming-Hsiung Yeh, Midland, Mich.

[73] Assignee: Dow Corning Corporation, Midland, Mich.

[21] Appl. No.: 68,020

[22] Filed: May 27, 1993

[51] Int. Cl.$^5$ .......................... B08B 3/08; C23G 1/02
[52] U.S. Cl. .......................... 134/3; 134/26; 134/28; 134/41; 134/42
[58] Field of Search .................. 134/3, 26, 28, 41, 42; 252/142

[56] References Cited

U.S. PATENT DOCUMENTS 4,833,093 5/1989 Malmqvist et al. ............... 134/42 X

FOREIGN PATENT DOCUMENTS 4149300 5/1992 Japan.

*Primary Examiner*—Richard O. Dean
*Assistant Examiner*—Saeed T. Chaudhry
*Attorney, Agent, or Firm*—Richard I. Gearhart

[57] ABSTRACT

The process of the present invention teaches a novel method of cleansing a silane coated substrate of excess vinyl benzaldehyde. The basic process comprises the step of rinsing the silane coated substrate in acid, prior to exposing the silane coated film to the beverage. Alternatively, the silane coated substrate may be washed with water after the silane coated substrate is rinsed in the acid. Another alternate method teaches repeating the acid wash and water rinse steps either with the same or a different acid.

7 Claims, No Drawings

METHOD FOR CLEANING AN ALDEHYDE FROM SILANE COATED CONTAINER WITH AN ACID SOLUTION

FIELD OF THE INVENTION

The process of the present invention teaches a novel method of cleansing a silane coated substrate of excess vinyl benzaldehyde.

BACKGROUND OF THE INVENTION

Silane coated substrates in the form of films are frequently used as packaging films for beverage containers. It has been discovered that vinyl benzaldehyde forms when the film comes into contact with acidic media. The residual vinyl benzaldehyde migrates from the substrate to the packaged beverage, producing undesirable odor and flavor characteristics in the beverage. The undesirable odor and flavor characteristics due to the presence of residual vinyl benzaldehyde are particularly acute where the beverage is a citrus drink.

SUMMARY OF THE INVENTION

The basic process comprises the step of rinsing the silane coated substrate in an aqueous acid solution prior to exposing the silane coated film to the beverage. Alternatively, the silane coated substrate may be rinsed with water after the silane coated substrate is washed in the acid. Another alternate method teaches repeating the acid wash and water rinse steps either with the same or a different acid.

DESCRIPTION OF THE PREFERRED EMBODIMENTS

While the invention is susceptible of embodiment in many different forms as described herein in detail, it should be understood that the present disclosure is to be considered an exemplification of the principles of the invention and is not intended to limit the spirit and scope of the invention and/or claims of the embodiments illustrated.

The process of the present invention teaches a novel method of cleansing a silane coated substrate. As will more fully be disclosed and described herein, some silane coatings will partially decompose to form an aldehyde when exposed to an acidic media. The silane coatings are typically exposed to an acidic media when used in beverage containers containing an acidic beverage such as orange juice. The aldehyde thus formed is typically vinyl benzaldehyde, which produces undesirable odor and flavor characteristics in the beverage. The process proposed herein will significantly reduce or eliminate the presence of vinyl benzaldehyde in beverages packaged with silane coated films.

The basic process comprises the step of cleansing the silane coated substrate in aqueous acid before the silane coated substrate comes into contact with the beverage. Alternatively, the silane coated substrate may be washed with water after the silane coated substrate is rinsed in the acid. Another alternate method teaches repeating the acid wash and water rinse steps either with the same or a different acid.

The silane coated substrate may be, for example, those prepared in accordance with the procedure disclosed in U.S. Pat. Nos. 5,077,135 and 5,096,738 to Wyman. In addition, the substrate of the silane coated substrate may be a composite film. For example, the silane coated substrate can be prepared by mixing a starting silane solution of one part of N-2-(vinylbenzylamino)-ethyl-3-aminopropyltrimethoxysilane solution (40% by weight in methanol), with one part of a mixture of 85% by weight of methanol and 15% by weight of water. The mixture is stirred, then aged for 16 hours at room temperature. This solution may be diluted with an additional methanol, if desired. A plastic substrate of low density polyethylene is corona treated then coated on both sides with the silane solution and allowed to dry for about two hours. The coated substrate is cured by electron beam irradiation with a total dose of 4 megarads bilateral treatment to form a silicone resin. The silane coated substrate may have a silicone resin layer of from 0.5 microns to 5.0 microns thickness, but is preferred to be approximately 1 micron thick.

The aqueous acid used in the acid wash step may be any acid, but is preferably phosphoric acid ($H_3PO_4$) having a concentration range of 0.1 to 50.0 percent by weight in water. The acid wash/water rinse process may be repeated any number of times, but is preferred to be repeated at least once. The washing/rinse steps may take place at any temperature, but preferably they should take place in an environment where the aqueous acid and water washes have a temperature between 20° and 80° C.

While the precise mechanism of the reaction between the coated substrate and the acid in the acid wash is not known with certainty, it is believed the N-2-(vinylbenzylamino)-ethyl-3aminopropyltrimethoxysilane forms a Schiff Base upon treatment with electron beam irradiation. The postulated reaction mechanism can be described as follows:

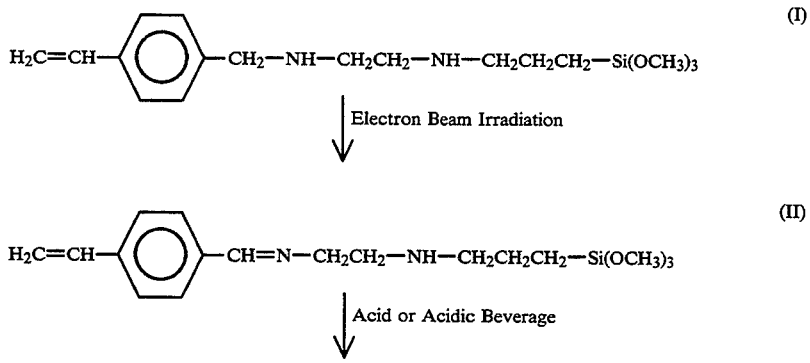

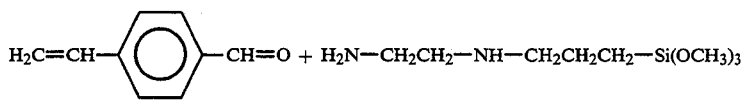

Compound (II) represents the Schiff Base which forms after electron beam irradiation. While Schiff Bases are stable in basic or neutral media, Schiff Bases are not stable in acid, and will tend to decompose to an aldehyde. Without the acid wash process as described herein, the Schiff Base formed in compound (II) will decompose to vinyl benzaldehyde (compound (III)) when exposed to an acidic beverage, such as orange juice or other citrus drink. Washing the substrate first with an acid as proposed herein causes the vinyl benzaldehyde of the silane coated substrate to form before the beverage contacts the silane coated film. The vinyl benzaldehyde formed as a result of the acid wash is carried away from the substrate as the acid is removed. Thus, there is no vinyl benzaldehyde formed when the silane coated substrate is exposed to an acidic beverage in the packaging container.

It is important to note that while the method of preparing the silane coated substrate described above uses N-2-(vinylbenzylamino)-ethyl-3-aminopropyltrimethoxysilane as the preferred starting silane in the silane mixture, the proposed method will work with any silane that tends to form a Schiff Base precursor when coated on a substrate and eventually forms the Schiff base when contacted with an acid. This class of starting silanes includes N-2-(vinylbenzylamino)-ethyl-3-aminopropyltrimethoxysilane.monohydrogen chloride or compounds of the general formula

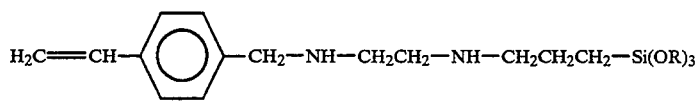

where R is an alkyl radical of from 1-4 carbon atoms inclusive.

The proposed mechanism of the invention described above further suggests that the specific type of acid used for the acid wash process is immaterial, and that any type of acid will suffice. Moreover, while the process described above may also incorporate hydrogen peroxide with the acid during the acid wash step, it is significant that the hydrogen peroxide is not an acid. The hydrogen peroxide is used primarily for sterilization of the silane coated substrate, said use being well known in the art. Thus, the hydrogen peroxide and the acid are combined for the purpose of eliminating a process step; it is not expected that the hydrogen peroxide contributes to the elimination of vinyl benzaldehyde.

EXAMPLES

A series of silane coated substrates were prepared by mixing a silane solution of one part of N-2-(vinylbenzylamino)-ethyl-3-aminopropyltrimethoxysilane solution (40% by weight in methanol), in one part of a mixture of 85% by weight of methanol and 15% by weight of water. The mixture was stirred, then aged for 16 hours at room temperature. Half of the silane solution was then diluted with an equal amount of methanol to form Silane Solution No. 1. The remainder of the silane solution was used undiluted as Silane Solution No. 2.

Two 8"×11" sheets of low density polyethylene were dip coated on both sides with Silane Solution No. 2, forming Sample Nos. 1 and 2. A third 8"×11" sheet of low density polyethylene was dip coated on both sides in Silane Solution No. 1 to form Sample No. 3. Sample Nos. 1-3 were then allowed to dry for about two hours. The Sample Nos. 1-3 were thereafter cured by electron beam irradiation with a total dose of 4 megarads bilateral treatment. The Samples Nos. 1-3 had a silane layer of approximately 1 micron thickness.

Sample No. 1 was not subjected to any acid wash process. Sample Nos. 2 and 3 were washed in phosphoric acid (5% by weight in water) for 30 seconds at 30° C., then washed in a mixture of phosphoric acid (5% by weight in water) and hydrogen peroxide (5% by weight in water) for 30 seconds at 30° C., then rinsed in cold water for 30 seconds to remove any acid residue remaining on the films.

Samples Nos. 1-3 were cut into 1.5 inch by 3 inch pieces. The pieces of each sample were placed in separate Erlenmeyer flasks filled with 125 ml orange juice (Everfresh 100% pure from concentrate, sold in a glass container by Everfresh, Inc.) A fourth flask containing only orange juice, but no pieces of the silane coated substrate served as a control and was designated Sample C. The four flasks were then sealed with glass stoppers wrapped in Teflon, and aged for two weeks in a refrigerator at 6°-7° C.

Thereafter, the pieces of Samples Nos. 1-3 were removed from the flasks. 50 ml. dimethyl ether was then added to each of the four flasks of orange juice to extract any soluble organic compounds such as vinyl benzaldehyde. The ether separated from the orange juice, and the product of the ether layer from each flask was analyzed on a gas chromatograph with the following results.

| Sample No. | x 8.61 | GC Peaks Rel. Area a 8.67 | y 8.88 | b 9.09 | c 9.30 |
| --- | --- | --- | --- | --- | --- |
| Control | 0 | 0.4 | 0 | 1.0 | 3.4 |
| 1 | 1.5 | 0.4 | 0.9 | 1.0 | 3.4 |
| 2 | 1.6 | * | 0.6 | 1.0 | 3.3 |
| 3 | 0 | * | 0 | 1.0 | 3.2 |

The foregoing data was generated on a Hewlett Packard 5890A Gas Chromatograph equipped with a Flame Ionization Detector, using a temperature program starting at 50° C. for 4 minutes, then increasing the temperature at a rate of 10° C. per minute.

The identification of the gas chromatograph peaks X and Y were made on a Hewlett Packard 5890/5971A Gas Chromatograph/Mass Spectrometer, where m/e is mass per electron, "m+" is the molecular ion which is the molecular weight of the vinyl benzaldehyde (132), "m+ —H" is the vinyl benzaldehyde molecule (mass=132) less one hydrogen atom (mass=1) resulting in an m/e of 131. "m+ —CHO" is 132 (m+) minus 29 (CHO) which gave a m/e of 103. The m/e 77 signal is the phenyl (C₆H₅) fragment which originally came from vinyl benzaldehyde.

The mass spectra of the peak X is: m/e (%); 132 (m+, 96), 131 (m+ —H, 91), 103 (m+ —CHO, 100), 77 (C₆H₅, 61). The Y peak: m/e (%); 132 (m+, 74), 131 (m+ —H, 100), 103 (m+ —CHO, 69), 77 (C₆H₅, 86). Both X and Y gave the same mass spectra except with different relative intensity (%) on each signal. This is a typical result of two isomers. The foregoing data indicates that the gas chromatograph data positively identifying the absence or presence of vinyl benzaldehyde in the separated ether layer is highly reliable, and that therefore the acid wash/rinse process effectively removes the excess vinyl benzaldehyde from the silane coated substrate.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

What I claim:

1. A method of cleansing an aldehyde from a silane coated substrate for use in a beverage container, comprising the step of washing said silane coated substrate in an acid, whereby said aldehyde is removed.

2. The method of claim 1, wherein said silane coated substrate is coated with silane solution containing

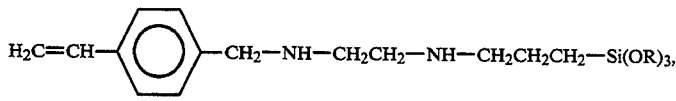

or

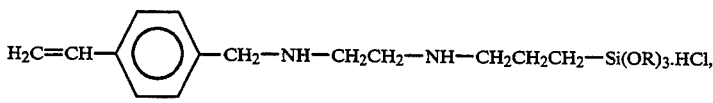

where R is an alkyl radical of from 1-4 carbon atoms inclusive.

3. The method of claim 1, wherein said aqueous acid is phosphoric acid.

4. The method of claim 1, comprising the additional step of rinsing the silane coated substrate with water after said wash in aqueous acid.

5. The method of claim 4 wherein said acid wash and said water rinse are repeated.

6. The method of claim 5, wherein said aqueous acid is phosphoric acid.

7. The method of claim 6, wherein said silane coated substrate is coated with silane solution containing

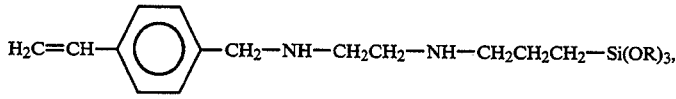

or

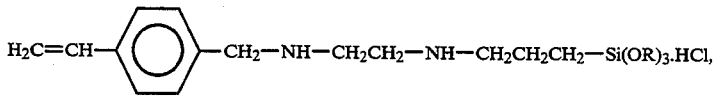

where R is an alkyl radical of from 1-4 carbon atoms inclusive.

* * * * *